United States Patent
Hauke et al.

(10) Patent No.: US 10,513,427 B2
(45) Date of Patent: Dec. 24, 2019

(54) METHOD AND FILLING DEVICE FOR FILLING A TRANSPORT CONTAINER WITH A FLUID

(71) Applicant: Merck Patent GmbH, Darmstadt (DE)

(72) Inventors: Guenter Hauke, Muehltal (DE);
Leticia Garcia Diez, Darmstadt (DE);
Volker Hilarius, Gross-Umstadt (DE)

(73) Assignee: Merck Patent GmbH (DE)

( * ) Notice: Subject to any disclaimer, the term of this patent is extended or adjusted under 35 U.S.C. 154(b) by 0 days.

(21) Appl. No.: 16/092,855

(22) PCT Filed: Apr. 18, 2017

(86) PCT No.: PCT/EP2017/059093
§ 371 (c)(1),
(2) Date: Oct. 11, 2018

(87) PCT Pub. No.: WO2017/182419
PCT Pub. Date: Oct. 26, 2017

(65) Prior Publication Data
US 2019/0127211 A1    May 2, 2019

(30) Foreign Application Priority Data

Apr. 19, 2016 (DE) .......... 10 2016 004 612

(51) Int. Cl.
*B01D 19/00* (2006.01)
*B41J 2/17* (2006.01)
(Continued)

(52) U.S. Cl.
CPC .......... *B67D 7/76* (2013.01); *B01D 19/0063* (2013.01); *B01D 36/001* (2013.01); *B01D 37/04* (2013.01);
(Continued)

(58) Field of Classification Search
CPC .......... B67D 7/76; B67D 7/763; B67D 7/766; B67D 7/78; B67D 2210/00002;
(Continued)

(56) References Cited

U.S. PATENT DOCUMENTS 4,804,464 A    2/1989 Schevey
4,990,260 A *  2/1991 Pisani ...................... B01J 47/04
                                                      210/664
(Continued)

FOREIGN PATENT DOCUMENTS

JP    2006321677 A    11/2006

OTHER PUBLICATIONS

International Search Report for PCT/EP2017/059093 dated Jul. 20, 2017.
(Continued)

*Primary Examiner* — Joseph W Drodge
(74) *Attorney, Agent, or Firm* — Drinker Biddle & Reath LLP

(57) ABSTRACT

In the case of a method for filling a transportation container (12) with a fluid, the fluid in a purification circuit (1) is conveyed multiple times through the purification installation (7), and by way of a contamination-measurement installation (15) a key contamination indicator of a fluid-specimen quantity in the purification circuit (1) is determined, wherein a filling procedure of the transportation container (12) with the fluid is terminated only once the key contamination indicator undershoots a first threshold value. The fluid-specimen quantity that is provided for determining the key contamination indicator may be diverted from the purification circuit (1), be infed to the contamination-measurement installation (15), and upon determining the key contamination indicator be returned to the purification circuit (1). In a container-purification step, a container-fluid quantity from (Continued)

Figure 1:
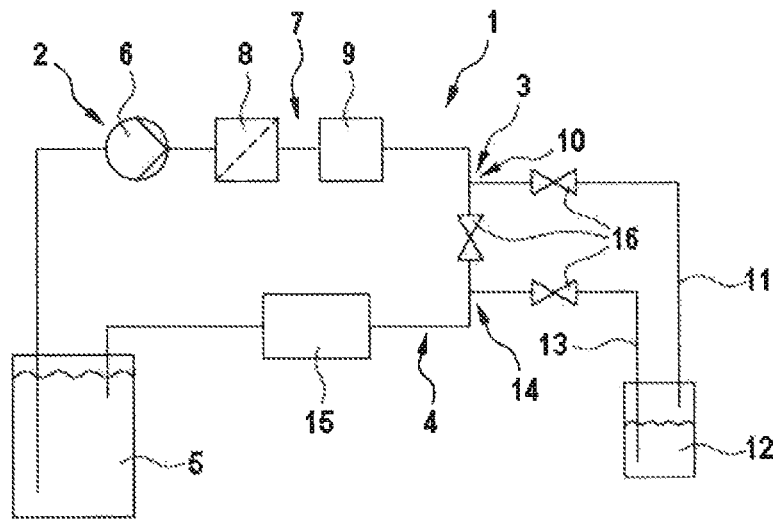

the purification circuit (1) that has previously been introduced into the transportation container (12) may be again retrieved from the transportation container (12) and be returned to the purification circuit (1). A key contamination indicator of that container-fluid quantity that has been retrieved from the transportation container (12) may be determined by the contamination-measurement installation (15), and the filling procedure of the transportation container (12) with the fluid may be terminated only once the key contamination indicator undershoots a third threshold value.

8 Claims, 1 Drawing Sheet

(51) Int. Cl.
| | | |
|---|---|---|
| B33Y 40/00 | (2015.01) | |
| B01D 36/00 | (2006.01) | |
| B01D 37/04 | (2006.01) | |
| B67D 7/76 | (2010.01) | |
| B41J 2/175 | (2006.01) | |
| B29C 64/314 | (2017.01) | |
| B29C 64/112 | (2017.01) | |

(52) U.S. Cl.
CPC ............ *B29C 64/314* (2017.08); *B33Y 40/00* (2014.12); *B41J 2/17506* (2013.01); *B41J 2/17559* (2013.01); *B29C 64/112* (2017.08)

(58) Field of Classification Search
CPC .... B67D 2210/0005; B67D 2210/0007; B67D 2210/001; B67D 2210/00018; B67D 2210/0047; B01D 37/04; B01D 36/001; B01D 19/0063; B01D 19/0042; B01D 19/0068; B01D 36/00; B01D 36/02; B01D 61/12; B01D 61/14; B01D 61/142; B01D 61/145; B01D 61/147; B01D 61/20; B01D 61/22; B01D 2311/06; B01D 2311/24; B01D 2311/246; B01D 2311/25; B01D 2311/26; B01D 2311/2653; B01D 2311/2657; B33Y 40/00; B29C 64/314; B29C 64/112; B41J 2/17506; B41J 2/17559
USPC .................. 95/1, 8, 46, 241; 96/6, 156, 219; 134/18, 902; 210/650, 651, 739, 745, 210/805, 806, 900, 96.1, 96.2, 143, 188, 210/194, 195.1, 195.2, 196, 259, 321.6, 210/321.72; 222/52, 189.06, 189.08
See application file for complete search history.

(56) References Cited

U.S. PATENT DOCUMENTS

| | | | | |
|---|---|---|---|---|
| 5,328,598 | A * | 7/1994 | Lohrl ................. | B01D 17/0202 210/93 |
| 6,464,867 | B1 * | 10/2002 | Morita ............... | B01F 3/04985 210/202 |
| 6,488,037 | B1 * | 12/2002 | Guldi ........................ | B08B 3/10 134/1.3 |
| 2002/0048213 | A1 * | 4/2002 | Wilmer ................ | B01F 5/0451 366/136 |
| 2003/0205285 | A1 | 11/2003 | Kelly et al. | |
| 2004/0182764 | A1 * | 9/2004 | Furukawa ............... | A61L 2/186 210/167.3 |
| 2004/0188352 | A1 * | 9/2004 | Dey ..................... | B01D 61/022 210/652 |
| 2004/0245175 | A1 * | 12/2004 | Godec .................. | B01D 61/022 210/739 |
| 2005/0016929 | A1 * | 1/2005 | Kashkoush ............. | C02F 9/005 210/739 |
| 2005/0236311 | A1 * | 10/2005 | Terrien ............... | B01D 17/0214 210/188 |
| 2005/0263458 | A1 * | 12/2005 | Kin ........................... | C02F 9/00 210/664 |
| 2007/0114682 | A1 * | 5/2007 | Morita .................. | B01F 3/0446 261/100 |
| 2007/0138096 | A1 * | 6/2007 | Tarr ...................... | B01D 61/022 210/650 |
| 2008/0023045 | A1 * | 1/2008 | Miller .................... | G05D 21/02 134/27 |
| 2010/0133292 | A1 * | 6/2010 | Ware ..................... | B67D 7/0261 222/1 |
| 2012/0006790 | A1 * | 1/2012 | Komori .................. | B01D 61/22 216/93 |
| 2012/0261339 | A1 * | 10/2012 | Brummer ............. | B01D 61/142 210/636 |
| 2013/0313191 | A1 * | 11/2013 | Wolf ........................ | C02F 9/00 210/638 |
| 2014/0260963 | A1 * | 9/2014 | Wang ..................... | B01D 35/02 95/8 |
| 2014/0283684 | A1 * | 9/2014 | Zahka ................ | B01D 19/0031 95/46 |
| 2015/0096441 | A1 * | 4/2015 | Iseki .................. | B01D 19/0063 95/259 |
| 2016/0159672 | A1 * | 6/2016 | Yokoi ..................... | C02F 1/444 210/636 |
| 2017/0166468 | A1 * | 6/2017 | Gorrell .................... | C02F 9/00 |

OTHER PUBLICATIONS

Written Opinion of the International Searching Authority for PCT/EP2017/059093 dated Jul. 20, 2017.

* cited by examiner

METHOD AND FILLING DEVICE FOR FILLING A TRANSPORT CONTAINER WITH A FLUID

CROSS-REFERENCE TO RELATED APPLICATIONS

This application is a national stage application (under 35 U.S.C. § 371) of PCT/EP2017/059093, filed Apr. 18, 2017, which claims benefit of German Application No. 102016004612.0, filed Apr. 19, 2016, both of which are incorporated herein by reference in their entirety.

The invention relates to a method for filling a transportation container with a fluid, wherein the fluid prior to being filled into the transportation container is conveyed through a purification device.

Various organic semiconductor materials which, for example, are suitable for the manufacturing of organic semiconductor components, and in particular for the manufacturing of organic light-emitting diodes and respective displays, have been developed in recent years. Various printing technologies by way of which the organic semiconductor materials that have been dissolved in a suitable solvent may be applied to a predefined surface are suitable inter alia for the processing of the organic semiconductor materials. In this manner, large-area displays, for example, which are assembled from a very large number of organic light-emitting diodes (OLEDS) that are actuatable in a mutually independent manner may be printed using ink-jet printing devices that are known in practice.

The printing technologies presently known enable rapid manufacturing of components, and in particular of displays from organic semiconductor materials, that is simple in terms of the method sequence. It has been demonstrated, however, that almost inevitable contamination of the dissolved organic semiconductor materials with particles and dissolved gases is of particular significance for the product quality of the components and of the displays. Despite great efforts in the manufacturing and the filling of organic semiconductor materials, contamination by foreign particles is difficult to avoid. Moreover, the organic semiconductor materials that are dissolved in the solvent are highly sensitive to the ambient air and also to moisture such that the organic semiconductor materials already upon brief contact with the ambient air can absorb a product-threatening quantity of gases and/or moisture.

In order to achieve the purity required for further processing of the organic semiconductor materials, the semiconductor materials that are dissolved in a suitable organic solvent are usually purified, filtered, and de-gassed in a multi-stage purification process. The purified fluid from the dissolved organic semiconductor material is subsequently filled into a transportation container and moved from the manufacturing site of the organic semiconductor materials to a production site of the respective components or displays, for the manufacturing of which the organic semiconductor material is required. Herein, the transportation containers are also purified prior to filling with organic semiconductor material, so as to minimize as far as possible the contamination of the fluid that is filled into and transported in the transportation containers. Furthermore, a significant effort is made also at the production site of the respective components and parts when the transportation container that has been transported there is connected to a production device and optionally also prior to starting-up and during the operation of the production device, so as to minimize as far as possible any contamination and pollution of the fluids that contain the organic semiconductor materials.

Since the material costs and the manufacturing effort for many organic semiconductor materials are very high, an attempt has to be made of using the organic semiconductor material as efficiently as possible in the manufacturing of the product, and of simultaneously minimizing as far as possible that proportion of the fluid of an individual transportation container that is not usable for the production of the components. For example, no excessive proportion of the fluid must be lost for the subsequent production by purification of the fluid. Moreover, dead volumes of connector installations of the transportation container or in the devices for purifying the fluid and for subsequent filling of the transportation container should be as small as possible so as to minimize as far as possible that proportion of the fluid that is not utilizable for the production of the components.

Since already the smallest quantities of contaminants and optionally individual particles of a contamination may render useless a product such as a large-size display, for example, that has been manufactured using the respective organic semiconductor material, very high requirements are often set for the manufacturing and transportation of the organic semiconductor material up to the production site of the respective components or displays, respectively. Therefore, measurements and checks of the quality of the dissolved organic semiconductor material in practice are carried out in the manner of random samples during and after the production of the dissolved organic semiconductor materials, so as to be able to verify and guarantee the predefined purity of the fluid. The effort associated therewith for the manufacturing and checking of the dissolved organic semiconductor material as well as for the transportation thereof up to the respective production site of the respective products is complex and cost intensive.

It is thus considered an object of the present invention to design a method for filling a transportation container with a fluid such that as minor as possible a contamination of the fluid in the transportation container may be achieved at the smallest possible effort.

This object according to the invention is achieved in that the fluid in a fluid-purification step in a purification circuit is conveyed multiple times through the purification installation, and by way of a contamination-measurement installation a key contamination indicator of a fluid-specimen quantity in the purification circuit is determined, and that a filling procedure of the transportation container with the fluid is terminated only once the key contamination indicator undershoots a first threshold value. The fluid may be circulated multiple times in the purification circuit. The fluid is conveyed through the purification installation and purified in the case of each purification cycle. The purification methods known in practice, such as filtering or de-gassing, for example, as a matter of principle and depending on the respective implementation have average or maximum purification efficiency, respectively, such that a respective proportion of contaminants may be separated and removed from the fluid during a purification step. By experience, adequate purity of the fluid may still not be achieved or guaranteed, respectively, in many cases following one-time purification of the fluid in a purification installation which contains a filter installation or a de-gassing installation, for example. By way of the integration of a contamination-measurement installation in the purification circuit, in which the fluid is conveyed multiple times through the purification installation and, on account thereof, is continuously purified more intensely, the remaining contamination may be detected at any time by the contamination-measurement installation and be considered in terms of the further process sequence or for filling the transportation container with the purified fluid, respectively. The key contamination indicator herein may be established continuously, at regular or predefined temporal intervals, or else only on demand or upon an inquiry by a user. The effort for establishing the key contamination indicator is very minor.

The contaminant content or the purity, respectively, of the fluid that is filled into the transportation container may be established for each transportation container by the method according to the invention. As compared to methods known in the prior art, in which dedicated fluid specimens are retrieved at an additional effort from individual and already filled transportation containers, these fluid specimens being examined for contaminants, each individual transportation container may be tested and the contaminant content of the fluid that has been filled thereinto may be checked without any appreciable additional effort by the method according to the invention.

Should it be ascertained during the filling of a transportation container that the key contamination indicator of the fluid-specimen quantity that has been established by the contamination-measurement installation proves an undesirably high contamination, a proportion of the fluid that has already been filled into the transportation container may again be retrieved, for example, so as to subsequently refill the transportation container with a more intensely purified fluid proportion. Consequently, the filling procedure may also include individual or multiple retrievals of an already filled fluid quantity from the transportation container. The filling procedure for a respective transportation container is terminated only once the key contamination indicator that has been measured by the contamination-measurement installation undershoots a threshold value that is predefined such that the desired purity of the fluid that is filled into the transportation container may be achieved and guaranteed in a adequately reliable manner.

The method according to the invention may advantageously be used for filling various fluids for which the purity of the filled fluid, or as minimal a contamination of the filled fluid as possible, respectively, is relevant. One field of application of the method according to the invention relates to organic semiconductor materials which are filled as a solution or as a component part of a liquid ink material, respectively, into a transportation container so as to be retrieved again from the transportation container at the envisaged site of consumption, and so as to be able to be used for the manufacturing of an organic semiconductor construction element. The organic semiconductor material herein may be used, for example, for the manufacturing of electronic or optoelectronic devices, such as, for example, liquid-coated or printed electronic, optoelectronic, photovoltaic, sensory or organic electroluminescent devices, preferably OLEDs, and particular preferably OLED displays. However, other fluids which may contain functional components or dissolved component parts, for example, for the function or effect of which, after the application thereof, it is necessary for the fluid as far as possible not to exceed predefined threshold values pertaining to a maximum permissible contamination may also be advantageously purified and filled into transportation containers by the filling method according to the invention.

According to one design embodiment of the inventive concept it is provided that filling of the transportation container with the purified fluid from the purification circuit commences only once the key contamination indicator undershoots a second threshold value. In many cases, it is expedient for the fluid to be filled in the purification circuit to initially be conveyed multiple times through the purification installation and, on account thereof, to be purified multiple times before filling of the transportation container commences. However, for example for reasons of efficiency, it may likewise be expedient for a minor proportion of the fluid quantity that circulates in the purification circuit to be diverted and filled into the transportation container despite a predefined number of complete perfusions of the purification circuit not yet having been achieved. In this case, the second threshold value may be achieved prior to the first threshold value. The transportation container in this instance is filled with a fluid that has been increasingly more intensely purified, wherein the resulting mean contamination of the entire content of the transportation container is below a predefined threshold value.

It is likewise conceivable for the second threshold value to be congruent with the first threshold value, and for filling of the transportation container to commence only once the fluid circulating in the purification circuit has reached a desired degree of purity. In this case, the filling procedure may be monitored exclusively by the fluid quantity that has already been filled into the transportation container, and the filling procedure may be terminated when a predefined filling quantity of the fluid has been filled.

In order not to limit the circulation of the fluid in the purification circuit by a dwell time of the fluid in the contamination-measurement installation that is required for a measurement to be carried out, it may be expediently provided that the fluid-specimen quantity that is provided for determining the key contamination indicator is diverted from the purification circuit, is infed to the contamination-measurement installation, and upon determining the key contamination indicator is returned to the purification circuit. On account thereof, the fluid in the purification circuit may circulate at a high flow rate which is optionally limited by a maximum flow rate that is predefined by the purification installation. The fluid-specimen quantity that is diverted from the purification circuit and is infed to the contamination-measurement installation may dwell in the latter independently of the flow rate that is predefined in the purification circuit, so as to enable measurements of adequate precision and accuracy. It is assumed herein that the fluid circulating in the purification circuit is adequately mixed and homogeneous, such that the key contamination indicator that is established by the fluid-specimen quantity is characteristic of the contamination of the fluid circulating in the purification circuit.

According to one particularly advantageous design embodiment of the inventive concept it is provided that, in a container-purification step, a container-fluid quantity from the purification circuit that has previously been introduced into the transportation container is again retrieved from the transportation container and is returned to the purification circuit. It has been demonstrated that the contamination of the fluid in the transportation container is not caused exclusively by an inevitable contamination of the fluid during the manufacturing of the fluid, but that contamination of the initially still empty; unfilled transportation container may contribute to an appreciable extent towards the contamination of the fluid that is subsequently filled into the transportation container. Dedicated purification of the transportation container is complex and cost intensive. Moreover, any in most cases inevitably remaining contamination of the empty transportation container could not be detected and considered during filling of the transportation container. For this reason, the transportation container may be incorporated into the purification circuit and be perfused by the fluid such that contaminants in the transportation container are absorbed by the fluid and may be filtered therefrom during a subsequent perfusion of the purification installation into the purification circuit.

Particularly reliable monitoring and predefining of the purity of the fluid which is filled into the transportation container may be achieved in that a key contamination indicator of that container-fluid quantity that has been retrieved from the transportation container is determined by the contamination-measurement installation, and in that the filling procedure of the transportation container with the fluid is terminated only once the key contamination indicator undershoots a third threshold value. In this way it may be ensured that not only the fluid that has been filled into the transportation container, but also that fluid that is subsequently retrieved from the transportation container, has a predefined purity. On account thereof, not only the degree of contamination or the degree of purity, respectively, of the fluid prior to filling into the container, but also the degree of purity of the fluid that is located in the transportation container, after the retrieval therefrom, may be detected or monitored, respectively, and on account thereof also be predefined by way of the contamination-measurement installation integrated in the purification circuit. The degree of purity that is established after the retrieval of the fluid from the transportation container most typically also corresponds to the degree of purity encountered by a user of the fluid, for example in the manufacturing of electronic components or displays, as long as no subsequent contamination of the fluid arises during the transportation of the transportation container to the user. This may be prevented to the largest extent by way of a suitable design embodiment of the transportation container.

Since according to experience any contamination of the transportation container is significantly more minor that any contamination of the fluid per se that has inevitably arisen during the manufacturing of the fluid, it is provided according to the invention that the container-purification step commences only once a key contamination indicator, determined in the fluid-purification step, of the fluid that is conveyed in the purification circuit undershoots a fourth threshold value. The fluid that is provided for filling the transportation container may thus initially circulate in the purification circuit, for example, until a key contamination indicator has dropped to a tenth of the original value. The transportation container may subsequently be incorporated into the purification circuit and be perfused by the circulating fluid so as to be evacuate the contaminants that are present in the transportation container. The fluid herein continues to circulate in the purification circuit until the key contamination indicator has dropped to one percent of the original value, and an adequate purity of the fluid circulating in the purification circuit and through the transportation container is confirmed.

According to one design embodiment of the inventive concept it is provided that the fluid in the fluid-purification step is conveyed through at least one particle filter and through a de-gassing installation. A combination of a particle filter and of a de-gassing installation is expedient and advantageous in particular in the case of filling with organic semiconductor materials, the subsequent utilization of which may be compromised and restricted both by particulate contaminants as well as by gaseous contaminants. It is likewise conceivable for a plurality of particle filters having congruent filter properties to be combined with one another, so as to increase the efficiency of the purification installation. A plurality of particle filters having dissimilar filter properties, or dissimilar filter classifications, respectively, may also be combined, and two or three particle filters which are able to filter increasingly small particle diameters may be sequentially disposed, for example. A combination of a plurality of de-gassing installations may also be expedient so as to filter dissimilar gases, for example, or so as to increase the efficiency of de-gassing in the case of a single pass through the purification installation.

It is expediently provided according to the invention that the key contamination indicator is composed of a key particle-content indicator and of a key gas-content indicator, each detected by the contamination-measurement installation. Contamination by particles and by a gas content may thus be checked in a mutually independent manner and by way of suitable threshold values may be acquired and considered for the sequence and for controlling the method according to the invention. It is likewise possible for a plurality of key particle-content indicators to be simultaneously detected and to be considered for the method sequence, such that, for example, the respective particle content of the fluid to be filled is monitored for dissimilar ranges of particle diameters, and purification of the fluid is continued until the respectively predefined threshold values are undershot or else achieved or maintained, respectively, in all relevant ranges of the particle diameters.

The invention also relates to a filling device for filling a transportation container with a fluid. According to the invention it is provided that the device has a purification circuit that is formed from fluid-line portions, and a purification installation and a contamination-measurement installation are disposed in the purification circuit, and in that a junction with a container-filling line which for filling may be connected to the transportation container is disposed in the purification circuit. The fluid that is provided for filling of the transportation container may be recirculated in a simple manner and, on account thereof, guided through the purification installation that is disposed in the purification circuit multiple times by way of the filling device according to the invention. An already achieved purification effect may simultaneously be checked by the contamination-measurement installation. After adequate purification of the fluid in the purification circuit the transportation container which is connected to the purification circuit by way of a junction may be filled with the purified fluid.

According to the invention it is provided that a confluence junction with a container return line which for emptying the transportation container may be connected to the transportation container is disposed in the purification circuit. In this way, the transportation container may be conjointly incorporated into the purification circuit such that the fluid circulating in the purification circuit may also be guided through the transportation container. On account thereof, contaminants that are located in the transportation container may be absorbed by the fluid and discharged from the transportation container. Additional purification of the transportation container may be performed without any appreciable additional effort in this way, so as to avoid any contamination of the fluid that has been filled into the transportation container for later use.

The transportation container herein may be fully incorporated into the purification circuit and be perfused by the entire fluid quantity that is recirculated in the purification circuit. It is likewise conceivable for the transportation container to be connected to the purification circuit by way of a bypass line and be perfused merely by a predefined part-quantity of the fluid that is circulating in the purification circuit.

The purification circuit may advantageously have a reservoir-connector installation by way of which a storage container for the fluid may be connected to the purification circuit. The purification circuit may be conceived such that the entire fluid quantity that is predefined in one storage container may continuously circulate through the purification circuit. If and when required, a plurality of transportation containers in this instance may be sequentially or optionally simultaneously connected to the purification circuit and be filled with the purified fluid. It is likewise possible that only that fluid quantity that is provided for filling the transportation container is injected into the purification circuit and is there purified so as to enable as rapid a purification as possible of the fluid quantity that is provided for filling the transportation container.

The purification installation expediently has at least one particle filter and one de-gassing installation. In many cases it may be advantageous for at least one first particle filter to be disposed in the flow direction ahead of the de-gassing installation, and for at least one second particle filter to be disposed behind the de-gassing installation. It is likewise conceivable for a plurality of particle filters having a congruent filtration effect, or else having mesh sizes or pore diameters that in the flow direction become smaller, to be combined. In the same way, a plurality of de-gassing installations of the same type or of different types may also be combined with one another, or be employed so as to alternate with particle filters, respectively.

The contamination-measurement installation in the flow direction is expediently disposed behind the purification installation such that the purification effect caused by the purification installation may already be detected by the contamination-measurement installation.

In order to be able to also detect the contaminants optionally caused by a connected transportation container that is perfused by the fluid and to be able to consider said contaminants in the further controlling of the method, it is provided that the confluence junction of the container return line in the flow direction is disposed ahead of the contamination-measurement installation.

Depending on the measurement methods and measurement devices of the contamination-measurement installation that are used in the individual case, it may be advantageous according to the invention for a bypass-line portion in which the fluid may be conveyed through contamination-measurement installation such that merely a predefinable fluid-specimen quantity is conveyed through the contamination-measurement installation is disposed in the purification circuit. In many cases, the measuring period that is required for detecting a key contamination indicator is significantly greater than the time period required by the fluid to perfuse the purification installation and to thereby be purified. In order to enable as large a throughput as possible and rapid purification of the fluid that circulates in the purification circuit, it may therefore be expedient for merely a small fluid-specimen quantity to be checked and evaluated in the contamination-measurement installation, while a predominant proportion of the circulating fluid may be conveyed past the contamination-measurement installation and already be infed to the purification installation again.

Figure 2:
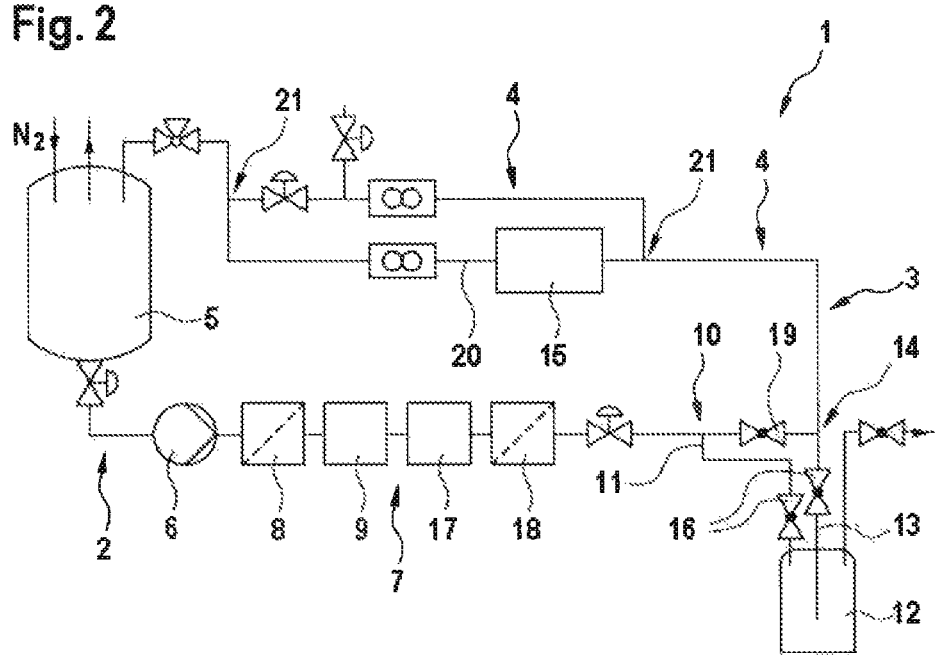

Exemplary embodiments of the inventive concept which are schematically illustrated in the drawing will be explained in an exemplary manner in more detail hereunder. In the drawing:

FIG. 1 shows a schematic illustration of a filling device according to the invention, having a purification circuit, having a purification installation that is disposed in the purification circuit, and having a contamination-measurement installation, and having a junction with a container-filling line; and FIG. 2 shows a schematic illustration of a filling device that is of a deviating design.

A filling device that is illustrated in an exemplary manner in FIG. 1 has a purification circuit 1 which is assembled from a plurality of fluid-line portions 2, 3, 4. The fluid-line portion 2 is connected to a storage container 5 that accepts 10 litres or 30 litres, for example, such that fluid that is located in the storage container 5 by way of a pump installation 6 may be conveyed from the storage container 5 to a purification installation 7. The purification installation 7 has a particle filter 8, for example a membrane-type filter, having a pore diameter of 1 μm. A de-gassing installation 9 by way of which the gas content in the fluid may be reduced is disposed in the flow direction behind the particle filter 8.

The fluid-line portion 3 adjoins the fluid-line portion 2. A first junction 10 which is connected to a container-filling line 11 is provided in the fluid-line portion 3. The container-filling line 11 is releasably connected to a transportation container 12 that is provided for filling. The transportation container 12 may have a capacity of 200 ml, for example, or of one litre, and depending on the application purpose be designed as a shipment pack or as a printer cartridge. A container return line 13 leads from the transportation container 12 back to the fluid-line portion 3 such that the fluid from the transportation container 12 by way of a second junction 14 may be conveyed back into the fluid-line portion 3 and thus back into the purification circuit 1 for the fluid.

The fluid is subsequently guided through the fluid-line portion 4 in which a contamination-measurement installation 15 is disposed. A key contamination indicator for the perfusing fluid may be established by the contamination-measurement installation 15. The fluid-line portion 4 opens into the storage container 5 again, on account of which the purification circuit 1 is closed.

According to the invention, various method sequences are possible in order for a fluid quantity to be retrieved from the storage container 5 and, following adequate purification in the purification circuit 1, to be filled into the transportation container 12.

The fluid may circulate in the purification circuit 1 and be continuously and increasingly purified in the purification installation 7 until a key contamination indicator that has been established by the contamination-measurement installation 15 undershoots a first threshold value for the maximum permissible contaminant content. The transportation container 12 may subsequently be filled with the purified fluid and be separated from the filling device.

The fluid may also initially circulate in the purification circuit 1 without the transportation container 12 being connected and being perfused by the fluid. A key contamination indicator is continuously established by the contamination-measurement installation 15, and the fluid is recirculated and circulated in the purification circuit 1 until a predefined second threshold value for the contaminant content is achieved or undershot, respectively. Subsequently, the transportation container 12 is incorporated into the purification circuit 1 by switching of valves 16 and is perfused by the already purified fluid. Any potential contaminants that are located in the transportation container 12 herein are absorbed by the fluid, initially detected in the contamination-measurement installation 15, and filtered out in subsequent perfusions of the purification installation 7 by the fluid. The circulation of the fluid through the transportation container 12 may be continued until the key contamination indicator that is established in the contamination-measurement installation 15 undershoots a third threshold value. The third threshold value may correspond to the first threshold value that has been mentioned and used in the exemplary embodiment that has been previously explained. A threshold value deviating therefrom may also be predefined, in order, for example, for a less stringent contaminant content post purification of the transportation container 12 to be predefined by the contamination-measurement installation 15, since any contamination by the already purified transportation container 12 may be precluded.

It is likewise possible for the transportation container 12 to be conjointly incorporated and perfused by the fluid already from the first circulation of the fluid through the purification circuit 1.

It may be achieved in all cases that the contaminants for that fluid quantity that has actually been filled into the transportation container 12 have been checked and reduced to below a predefined threshold value prior to the filling procedure being terminated and the filled transportation container 12 being separated and retrieved from the filling device. A subsequent check measurement is no longer required.

A filling device of a deviating design is schematically illustrated in an exemplary manner in FIG. 2. The purification installation 7, in addition to the de-gassing installation 9, has an oxygen probe 17. The first particle filter 8 in the flow direction is disposed ahead of the de-gassing installation 9 and the oxygen probe 17. A second particle filter 18 in the flow direction is disposed behind the oxygen probe 17. The first particle filter 8 has a membrane-type filter having a pore diameter of 0.1 µm. The second particle filter 18 has a membrane-type filter having a pore diameter of 0.05 µm.

The transportation 12 is likewise incorporated into the purification circuit 1 by way of valves 16. Additional controlling potentials for the fluid circulation are provided by way of further valves 19.

The contamination-measurement installation 15 is disposed in a bypass-line portion 20 which by way of junctions 21 is connected to the fluid-line portion 4. Only a small fluid-specimen quantity which merely represents a minor proportion of the fluid that circulates in the purification circuit 1 in each case perfuses the contamination-measurement installation 15. The respective proportion of the fluid quantity that perfuses the bypass-line portion 20 and the fluid-line portion 4, routed in parallel with the former, may be detected or checked, respectively, by way of through-flow-measurement installations 22.

Independently of the respective design embodiment of the filling device, or of the exemplary embodiments shown in FIG. 1 and in FIG. 2, respectively, it is possible for a flexible transportation container which may be a bag or a flexible plastics-material container, for example, to be used instead of a rigid transportation container 12 which may be a bottle or a metallic container, for example. If and when the transportation container 12 is conjointly incorporated into the purification circuit 1, in the case of the rigid transportation container 12, an almost arbitrary fluid quantity may be retrieved or topped up by way of respective lances or pressure valves, wherein a variable proportion of the fluid remains in the transportation container 12 at all times. It may also be expedient, in particular in the case of a flexible transportation container, for the flexible transportation container in each case to be successively completely filled and subsequently completely emptied.

A few filling procedures which are carried out in an illustrative manner by way of the filling device according to the invention will be described hereunder in an exemplary manner.

The fluid contains organic semiconductor materials, for example OLED materials, and optionally further additives. The components of the fluid are put into a container having the presupplied solvent or solvent mixture, respectively, according to a weight table. The materials thereafter are mixed and dissolved in a tumbling mixer.

The fluids that are employed in the exemplary embodiments are commercially available products by Merck KGaA.

EXEMPLARY EMBODIMENTS

Example 1

The mixed fluid by means of gas pressure is conveyed by purified nitrogen into the storage container 5 of a filling device which substantially corresponds to the filling device shown in FIG. 2. The nitrogen used for conveying has previously been filtered by way of a gas filter. According to FIG. 1, the storage container 5 is connected to a pump 6 (Levitronix), to a membrane-type de-gassing unit 9, and to two PTFE filters 8, 18, having a pore size of 0.1 µm and 0.05 µm, respectively (Entegris). The purification process according to the invention is performed in such a way that the fluid is initially cycled in an optical particle counter by way of the pump 6, the filter installation 7, and the contamination-measurement installation 15, and the measured key contamination indicator is compared with desired or predefined target parameters, respectively. The fluid (ink, or else only the solvent, respectively) after passing the contamination-measurement installation 15 is returned to the storage container 5 and is mixed with the fluid that is located therein. The fluid is recirculated in the purification circuit until the desired purification effect is achieved and is proven by way of the contamination-measurement installation 15.

Tables 1 and 2 reproduced hereunder show a summary of the particle contents that have been measured by the contamination-measurement installation 15 for particles of various sizes for solvent and inks at various cycling times. The respective fluids require dissimilar purification times until the target value is achieved. While the Reserver Cleaning Solvent and the MRE inks require a cycling time of 30 minutes to one hour, the other fluids require approximately 2 to 6 hours in order to achieve the predefined target value, or to undershoot the respective threshold values for a contaminant content, respectively.

TABLE 1

Particle content for various fluids upon increasing cycle times.
Number of particles per 10 ml solution

| Product name | Size | 1 min | 10 min | 30 min | 1 h | 2 h | 6 h | 10 h | 15 h | 20 h |
|---|---|---|---|---|---|---|---|---|---|---|
| MRE3-0669 | >0.15 μm | 14 | 1 | 0 | | | | | | |
| | >0.2 μm | 4 | 0 | 0 | | | | | | |
| | >0.3 μm | 2 | 0 | 0 | | | | | | |
| | >0.4 μm | 2 | 0 | 0 | | | | | | |
| | >0.5 μm | 2 | 0 | 0 | | | | | | |
| Reserver Cleaning Solvent 1 | >0.15 μm | 848 | 139 | 8 | 5 | 0 | | | | |
| | >0.2 μm | 451 | 74 | 4 | 3 | 0 | | | | |
| | >0.3 μm | 104 | 24 | 1 | 1 | 0 | | | | |
| | >0.4 μm | 68 | 18 | 1 | 1 | 0 | | | | |
| | >0.5 μm | 42 | 12 | 0 | 1 | 0 | | | | |
| MRE3-7306 | >0.15 μm | 9 | 4 | 3 | 3 | 0 | 1 | | | |
| | >0.2 μm | 1 | 1 | 0 | 1 | 0 | 0 | | | |
| | >0.3 μm | 0 | 0 | 0 | 0 | 0 | 0 | | | |
| | >0.4 μm | 0 | 0 | 0 | 0 | 0 | 0 | | | |
| | >0.5 μm | 0 | 0 | 0 | 0 | 0 | 0 | | | |
| MHL3-6689 | >0.2 μm | 614 | 82 | 38 | 20 | 10 | 7 | 6 | 11 | |
| | >0.3 μm | 31 | 6 | 0 | 0 | 2 | 0 | 0 | 0 | |
| | >0.4 μm | 18 | 4 | 0 | 0 | 2 | 0 | 0 | 0 | |
| | >0.5 μm | 14 | 3 | 0 | 0 | 2 | 0 | 0 | 0 | |
| MHL3-8873 | >0.2 μm | 537 | 158 | 93 | 45 | 30 | 25 | 22 | 15 | |
| | >0.3 μm | 27 | 3 | 4 | 0 | 1 | 0 | 1 | 1 | |
| | >0.4 μm | 12 | 1 | 2 | 0 | 0 | 0 | 0 | 1 | |
| | >0.5 μm | 8 | 1 | 0 | 0 | 0 | 0 | 0 | 1 | |

TABLE 2

Particle content for various fluids upon increasing cycle times.
Number of particles per 10 ml solution

| Product name | Size | 1 min | 10 min | 30 min | 1 h | 2 h | 6 h | 10 h | 15 h | 20 h |
|---|---|---|---|---|---|---|---|---|---|---|
| MGE3-2449 | >0.15 μm | 188 | 22 | 28 | 8 | 2 | 12 | 5 | 0 | |
| | >0.2 μm | 106 | 8 | 8 | 4 | 1 | 1 | 1 | 0 | |
| | >0.3 μm | 44 | 3 | 3 | 2 | 0 | 0 | 0 | 0 | |
| | >0.4 μm | 36 | 1 | 2 | 1 | 0 | 0 | 0 | 0 | |
| | >0.5 μm | 27 | 0 | 1 | 1 | 0 | 0 | 0 | 0 | |
| MGE3-5237 | >0.15 μm | 205 | 36 | 11 | 6 | 2 | 4 | 4 | 1 | |
| | >0.2 μm | 50 | 11 | 1 | 0 | 1 | 1 | 1 | 0 | |
| | >0.3 μm | 5 | 5 | 0 | 0 | 0 | 1 | 0 | 0 | |
| | >0.4 μm | 2 | 5 | 0 | 0 | 0 | 1 | 0 | 0 | |
| | >0.5 μm | 1 | 4 | 0 | 0 | 0 | 0 | 0 | 0 | |
| MHL3-2892 | >0.15 μm | 436 | 114 | 43 | 17 | 15 | 8 | 11 | 14 | 7 |
| | >0.2 μm | 84 | 23 | 6 | 2 | 1 | 0 | 3 | 2 | 1 |
| | >0.3 μm | 16 | 8 | 2 | 1 | 0 | 0 | 0 | 0 | 0 |
| | >0.4 μm | 10 | 4 | 1 | 1 | 0 | 0 | 0 | 0 | 0 |
| | >0.5 μm | 8 | 3 | 0 | 1 | 0 | 0 | 0 | 0 | 0 |
| MBL3-6282 | >0.2 μm | 37 | 35 | 51 | 66 | 48 | 16 | 15 | 5 | 3 |
| | >0.3 μm | 9 | 6 | 17 | 29 | 11 | 0 | 0 | 1 | 0 |
| | >0.4 μm | 6 | 6 | 11 | 19 | 4 | 0 | 0 | 1 | 0 |
| | >0.5 μm | 3 | 2 | 7 | 13 | 3 | 0 | 0 | 1 | 0 |
| MHL3-9183 | >0.15 μm | 893 | 499 | 269 | 136 | 97 | 64 | 50 | 59 | 49 |
| | >0.2 μm | 163 | 89 | 40 | 23 | 15 | 10 | 6 | 5 | 6 |
| | >0.3 μm | 11 | 16 | 3 | 3 | 2 | 0 | 0 | 0 | 0 |
| | >0.4 μm | 5 | 11 | 1 | 1 | 0 | 0 | 0 | 0 | 0 |
| | >0.5 μm | 2 | 8 | 1 | 1 | 0 | 0 | 0 | 0 | 0 |

Example 2

The filling process is started once the respective fluid according to Example 1 is present in a purified manner in the purification circuit. The transportation container 12 herein is incorporated into the purification circuit 1. The fluid quantity that is retrieved from the transportation container 12 is then returned into the purification cycle again by way of the valve 16 and the junction 4. A throughflow-measurement installation and the contamination-measurement installation 15 by way of which the overall content of dissolved gases and especially the content of oxygen may be detected are located in the return line to the storage container 5. The transportation container 12 is rinsed using already purified fluid until the target parameters are achieved in the return flow from the transportation container 12. As an example, a plurality of 150 ml bottles (purified Merck brown-glass bottles) as transportation containers 12 were filled with the "Reserver Cleaning Solvent" fluid. The bottles herein were incorporated into the purification circuit 1 until the target parameter is achieved. The particle measurement of the various particle sizes for the bottles F1, F2, F3, and F6 are summarized in Table 3. While between 1 and 2 hours are required for the target value to be achieved in the case of bottles F1, F2, and F6, bottle F3 requires only 10 minutes.

TABLE 3

Filling the fluid "Reserver Cleaning Solvent" into 150 ml brown glass bottles. Number of particles per 10 ml solution

| Bottle no. | Rinsing cycle | Size | 1 min | 10 min | 30 min | 40 min | 50 min | 1 h | 2 h |
|---|---|---|---|---|---|---|---|---|---|
| F1 | 1 | >0.15 μm | 848 | 139 | 8 | 3 | 1 | 5 | 1 |
|  |  | >0.2 μm | 451 | 74 | 4 | 2 | 1 | 3 | 0 |
|  |  | >0.3 μm | 104 | 24 | 1 | 2 | 1 | 1 | 0 |
|  |  | >0.4 μm | 68 | 18 | 1 | 1 | 0 | 1 | 0 |
|  |  | >0.5 μm | 42 | 12 | 0 | 0 | 0 | 1 | 0 |
| F1 | 2 | >0.15 μm | 2 | 7 | 11 | 3 | 3 | 0 |  |
|  |  | >0.2 μm | 1 | 3 | 7 | 2 | 2 | 0 |  |
|  |  | >0.3 μm | 1 | 3 | 5 | 1 | 2 | 0 |  |
|  |  | >0.4 μm | 1 | 0 | 4 | 0 | 1 | 0 |  |
|  |  | >0.5 μm | 1 | 0 | 1 | 0 | 1 | 0 |  |
| F2 | 1 | >0.15 μm | 185 | 2 | 1 | 0 | 1 | 0 |  |
|  |  | >0.2 μm | 78 | 0 | 1 | 0 | 1 | 0 |  |
|  |  | >0.3 μm | 13 | 0 | 0 | 0 | 1 | 0 |  |
|  |  | >0.4 μm | 9 | 0 | 0 | 0 | 0 | 0 |  |
|  |  | >0.5 μm | 8 | 0 | 0 | 0 | 0 | 0 |  |
| F3 | 1 | >0.15 μm | 4 | 0 |  |  |  |  |  |
|  |  | >0.2 μm | 2 | 0 |  |  |  |  |  |
|  |  | >0.3 μm | 0 | 0 |  |  |  |  |  |
|  |  | >0.4 μm | 0 | 0 |  |  |  |  |  |
|  |  | >0.5 μm | 0 | 0 |  |  |  |  |  |
| F6 | 1 | >0.15 μm | 679 | 27 | 18 | 8 | 7 | 5 |  |
|  |  | >0.2 μm | 298 | 15 | 10 | 6 | 4 | 0 |  |
|  |  | >0.3 μm | 71 | 4 | 3 | 4 | 1 | 0 |  |
|  |  | >0.4 μm | 38 | 2 | 3 | 4 | 0 | 0 |  |
|  |  | >0.5 μm | 18 | 1 | 2 | 3 | 0 | 0 |  |

Example 3

The filling process is started once the desired fluid according to Example 1 is present in a purified manner in the purification circuit. In this example, filling into transportation containers 12 that are configured as ink cartridges is described. To this end, the filling device includes the additional function of rinsing the transportation containers 12 by alternating filling and emptying, using the already purified fluid. This alternating operation is repeated multiple times until the desired contamination concentration is achieved and a predefined threshold value for the key contamination indicator is undershot. To this end, the container return line 13 during emptying of the transportation container 12 is connected to the fluid-line portion 3 and subsequently to the contamination-measurement installation 15, in order for the key contamination indicator to be established. The fluid, after passing through the contamination-measurement installation 15, is returned to the storage container 5 again, and is again mixed with the fluid located in the latter.

The product MBL3-6282 that had previously been purified according to Example 1, was filled into two printer cartridges. These printer cartridges were subjected to a plurality of flushing cycles, each consisting of filling and subsequent emptying of the transportation container 12. The data pertaining to the content of particles of the various sizes are illustrated for the printer cartridges 1 and 2 in Table 4. While four flushing cycles are required for achieving the desired value in the case of printer cartridge 1, the target values in the case of printer cartridge 2 are achieved already after only two cycles.

TABLE 4

Filling of MBL3-6282 into two printer cartridges. Number of particles per 10 ml solution

| Flushing no. | Size | Printer cartridge no. 1 | 2 |
|---|---|---|---|
| Flushing 1 | >0.2 μm | 1138 | 583 |
|  | >0.3 μm | 253 | 71 |
|  | >0.4 μm | 185 | 46 |
|  | >0.5 μm | 139 | 33 |
| Flushing 2 | >0.2 μm | 281 | 282 |
|  | >0.3 μm | 41 | 20 |
|  | >0.4 μm | 29 | 12 |
|  | >0.5 μm | 21 | 8 |
| Flushing 3 | >0.2 μm | 161 |  |
|  | >0.3 μm | 36 |  |
|  | >0.4 μm | 29 |  |
|  | >0.5 μm | 22 |  |
| Flushing 4 | >0.2 μm | 229 |  |
|  | >0.3 μm | 18 |  |
|  | >0.4 μm | 12 |  |
|  | >0.5 μm | 9 |  |

The invention claimed is:

1. A method for filling a transportation container with a fluid, which comprises the fluid prior to being filled into the transportation container being conveyed through a purification installation, wherein the fluid in a fluid-purification step in a purification circuit is conveyed multiple times through the purification installation, and by way of a contamination-measurement installation a contamination indicator of a fluid-specimen quantity in the purification circuit is determined, and in that the filling of the transportation container with the fluid is terminated once the contamination indicator undershoots a first threshold value.

2. The method according to claim 1, wherein filling of the transportation container with the purified fluid from the purification circuit commences once the contamination indicator undershoots a second threshold value.

3. The method according to claim 2, wherein the contamination indicator of that container-fluid quantity that has been retrieved from the transportation container is determined by the contamination-measurement installation, and in that the filling of the transportation container with the fluid is terminated once the contamination indicator undershoots a third threshold value.

4. The method according to claim 1, wherein a fluid-specimen quantity that is provided for determining the contamination indicator is diverted from the purification circuit, is infed to the contamination-measurement installation, and upon determining the contamination indicator is returned to the purification circuit.

5. The method according to claim 1, wherein, in a container-purification step, a container-fluid quantity from the purification circuit that has previously been introduced into the transportation container is again retrieved from the transportation container and is returned to the purification circuit.

6. The method according to claim 5, wherein the container-purification step commences once a contamination indicator, determined in the fluid-purification step, of the fluid that is conveyed in the purification circuit undershoots a fourth threshold value.

7. The method according to claim 1, wherein the fluid in the fluid-purification step is conveyed through at least one particle filter and through a de-gassing installation.

8. The method according to claim 1, wherein the contamination indicator comprises a single particle-content indicator and a gas-content indicator, each detected by the contamination-measurement installation.

* * * * *